United States Patent [19]

Berger et al.

[11] Patent Number: 5,043,877
[45] Date of Patent: Aug. 27, 1991

[54] ARCHITECTURE CONVERTER FOR SLAVE ELEMENTS

[75] Inventors: Erwin R. Berger, Endicott; Howard T. Olnowich, Endwell, both of N.Y.

[73] Assignee: International Business Machines Corp., Armonk, N.Y.

[21] Appl. No.: 596,836

[22] Filed: Oct. 12, 1990

[51] Int. Cl.⁵ .............................................. G06F 3/00
[52] U.S. Cl. .................................. 364/200; 364/228; 364/229.1; 364/239.3; 364/232 X; 364/260; 364/260.9
[58] Field of Search ............ 364/200, 228, 260, 260.1, 364/900

[56] References Cited

U.S. PATENT DOCUMENTS

| 3,902,162 | 8/1975 | Parkinson et al. | 364/200 |
| 4,313,160 | 1/1982 | Kaufman et al. | 364/200 |
| 4,328,543 | 5/1982 | Brickman et al. | 364/200 |
| 4,363,094 | 12/1982 | Kaul et al. | 364/200 |
| 4,631,666 | 12/1986 | Harris et al. | 364/200 |
| 4,680,732 | 7/1987 | Dicenzo | 364/900 |
| 4,688,168 | 8/1987 | Gudaitis et al. | 364/200 |
| 4,937,785 | 6/1990 | Deering | 364/900 |

Primary Examiner—Michael R. Fleming
Assistant Examiner—Robert S. Hauser
Attorney, Agent, or Firm—Stephen A. Terrile

[57] ABSTRACT

An apparatus for transferring data between a computer system having a first architecture and a slave element having a second architecture. The apparatus includes a first connector corresponding to the first architecture, a second connector corresponding to the second architecture, and conversion circuitry located between the first connector and the second connector. The conversion circuitry converts signals corresponding to the first architecture to signals corresponding to the second architecture and signals corresponding to the second architecture to signals corresponding to the first architecture.

34 Claims, 6 Drawing Sheets

ARCHITECTURE CONVERTER FOR SLAVE ELEMENTS

CROSS-REFERENCE TO RELATED APPLICATIONS

This application is related to the commonly-assigned application of Erwin R. Berger and Howard T. Olnowich, titled Architecture Converter for Controller Elements, U.S. Ser. No. 07/597903.

BACKGROUND OF THE INVENTION

The present invention relates to the use of expansion cards in computer systems.

Generally in computer systems and especially in personal computer systems, data are transferred between various elements such as a central processing unit (CPU), input/output (I/O) adapters, I/O devices, bus controllers (i.e., elements which can control the computer system such as bus masters or direct memory access (DMA) controllers and slaves), bus slaves (i.e., elements which are controlled by bus controllers) as well as memory devices such as the system memory. These elements are often interconnected via a system bus which is part of a system architecture. The architecture is designed for the movement of data, address and command information with or between these elements. In personal computer systems, one such architecture has become an industry standard and is known as the Family I or IBM/AT bus architecture.

The Family I bus architecture has become widely used by personal computers such as the 8-bit IBM PC and 16-bit IBM AT. The Family I bus architecture transfers information using eight parallel paths (an 8-bit wide bus) or 16 parallel paths (a 16-bit wide bus). A significant feature of the Family I bus architecture is the requirement of performing all transfers in synchronization with one basic clock signal. The clock signal is an 8 MHZ signal which is provided to every element which is connected to the bus.

Because of the popularity of the Family I bus architecture, it has become advantageous to extend the Family I architecture to a 32-bit wide format. However, some customers may wish to maintain downward compatibility with the original Family I bus architecture. One such extended Family I architecture is the Extended Industry Standard Architecture (EISA). EISA is described in the *EISA Specification*, BCPR services, Inc., (1989).

Another architecture is available from IBM Corporation under the trademark Micro Channel. Micro Channel computers provide a 32-bit format which is not compatible with the Family I architecture.

SUMMARY OF THE INVENTION

It has been discovered that providing an adapter which includes a connector configured to connect with an EISA type bus, a connector configured to connect with a Micro Channel type element and circuitry configured to convert input signals conforming to EISA to input signals conforming to the Micro Channel architecture and output signals conforming to Micro Channel architecture to output signals conforming to EISA allows elements which conform the Micro Channel architecture to be used in systems which conform to EISA.

In summary, the invention is an apparatus for transferring data between a computer system having a first architecture and an expansion device having a second architecture. The apparatus includes a first connector corresponding to the first architecture, a second connector corresponding to the second architecture, and conversion circuitry located between the first connector and the second connector. The conversion circuitry converts signals corresponding to the first architecture to signals corresponding to the second architecture and signals corresponding to the second architecture to signals corresponding to the first architecture.

Throughout the specification and drawings, a # designates an active low signal and all 16-bit addresses are given in hexadecimal notation.

DETAILED DESCRIPTION

Figure 1:
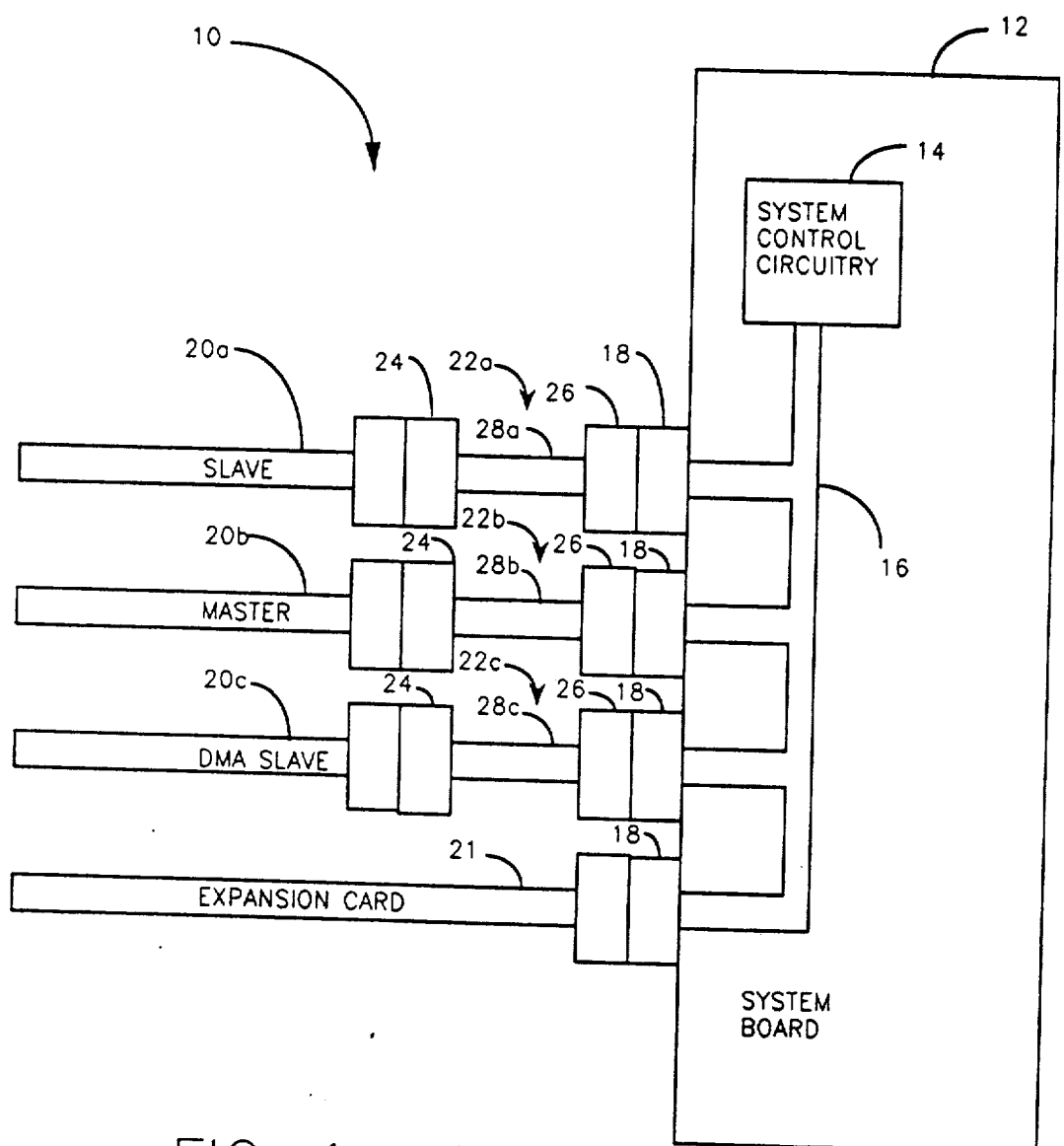
FIG. 1 is a diagrammatic-block diagram of a computer system according to the present invention.
Figure 2:
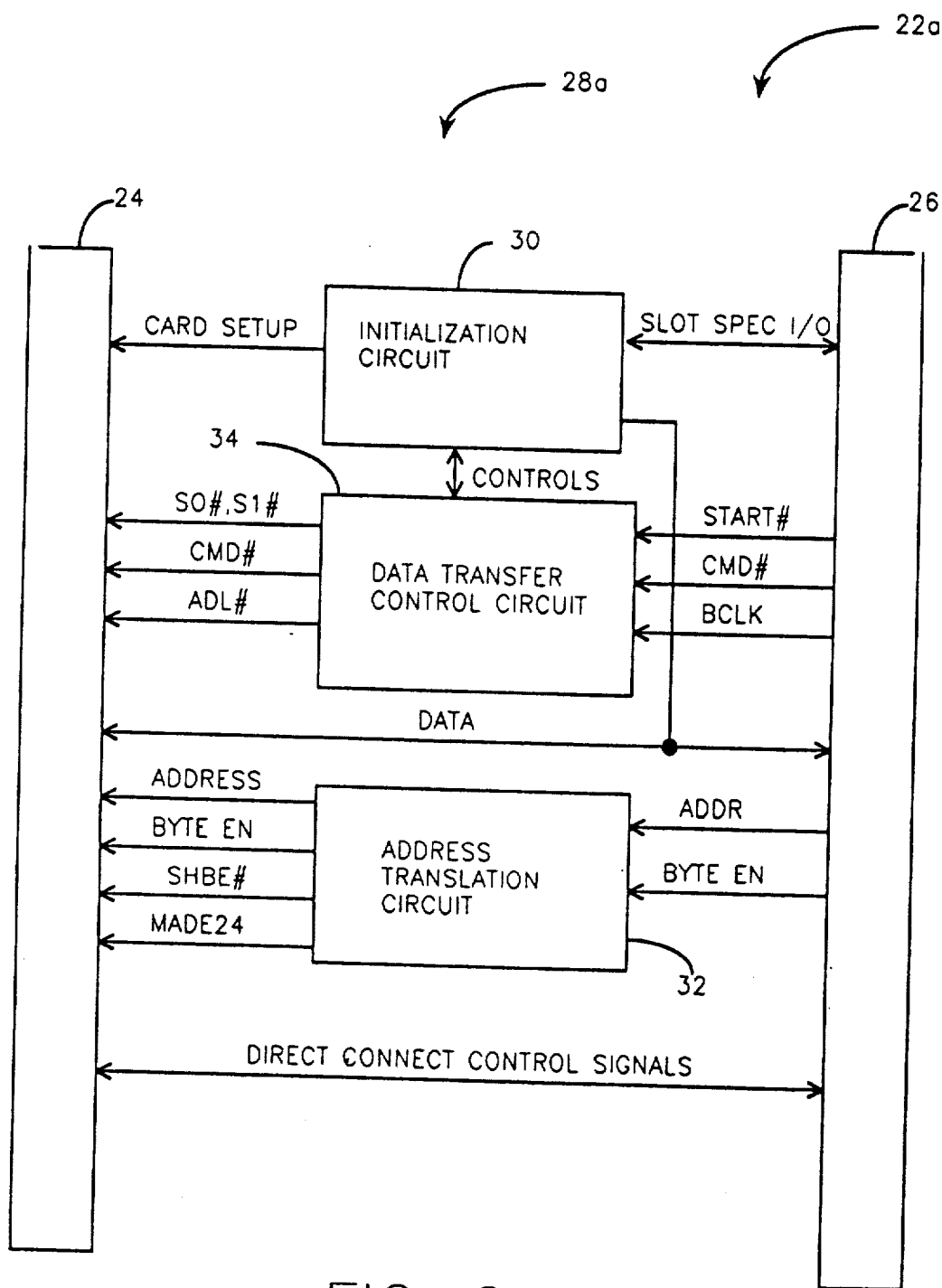
FIG. 2 is a diagrammatic-block diagram of a slave adapter according to the present invention.

Referring to FIGS. 1 and 2, computer system 10 includes system board 12 having system control circuitry 14, which includes the CPU and system memory, bus 16, which conforms to a first architecture, preferably EISA, and a plurality of expansion slots 18, which are connected to bus 16. Computer system 10 also includes expansion cards 20a, 20b, 20c (referred to generally as 20), which conform to a second architecture, preferably the Micro Channel architecture, expansion card 21, which conforms to EISA, and adapters 22a, 22b, 22c (referred to generally as 22), which mechanically and electrically connect cards 20a, 20b, 20c to expansion slots 18 of board 12. It is understood that computer system 10 is not limited to this configuration, but that it can include any combination of expansion cards 20, 21. The height of the combination of adapter 22 and expansion card 20 is less than or equal to the height of expansion card 21 so that the combination of adapter 22 and expansion card 20 may fit into a computer which is designed for expansion cards 21.

Each adapter 22 includes Micro Channel connector 24, which corresponds to the Micro Channel architecture, EISA connector 26, which corresponds to EISA, and interface conversion logic 28 which converts signals conforming to the Micro Channel architecture to signals conforming to EISA and vice versa. Interface conversion logic 28 varies depending on whether expansion card 20 is a slave card 20a, a master card 20b, or a DMA slave card 20c.

Referring to FIG. 2, interface conversion logic 28a for adapter 22a is configured to adapt a Micro Channel slave card 20a to bus 16 and includes initialization circuit 30, address translation circuit 32, and data transfer control circuit 34. Initialization circuit 30 receives EISA initialization and control signals and transforms these signals to provide Micro Channel initialization and control signals. Address translation circuit 32 receives EISA address information and transforms the EISA address information into Micro Channel address information. Data transfer control circuit 34 receives EISA data transfer control information and transforms it into Micro Channel data transfer control information and receives Micro Channel data transfer control information and transforms it into EISA data transfer control information.

Additionally, interface conversion logic 28a provides direct connections between EISA data and Micro Channel data as well as for a plurality of control signals. The direct connect control signals include an oscillator signal (OSC), a reset signal (CHRESET for Micro Channel and RESDRV for EISA), an error reporting signal (CHCK# for Micro Channel and IOCHK# for EISA); a refresh signal (REFRESH# for both Micro Channel and EISA), and interrupt request signals (IRQ3 - 7, 9 - 12, 14, 15 for both Micro Channel and EISA). The interrupt request signals are directly connected because system control circuitry 14 is programmed to accept active low, shared interrupt signals on any interrupt line used by card 20.

Figure 3:
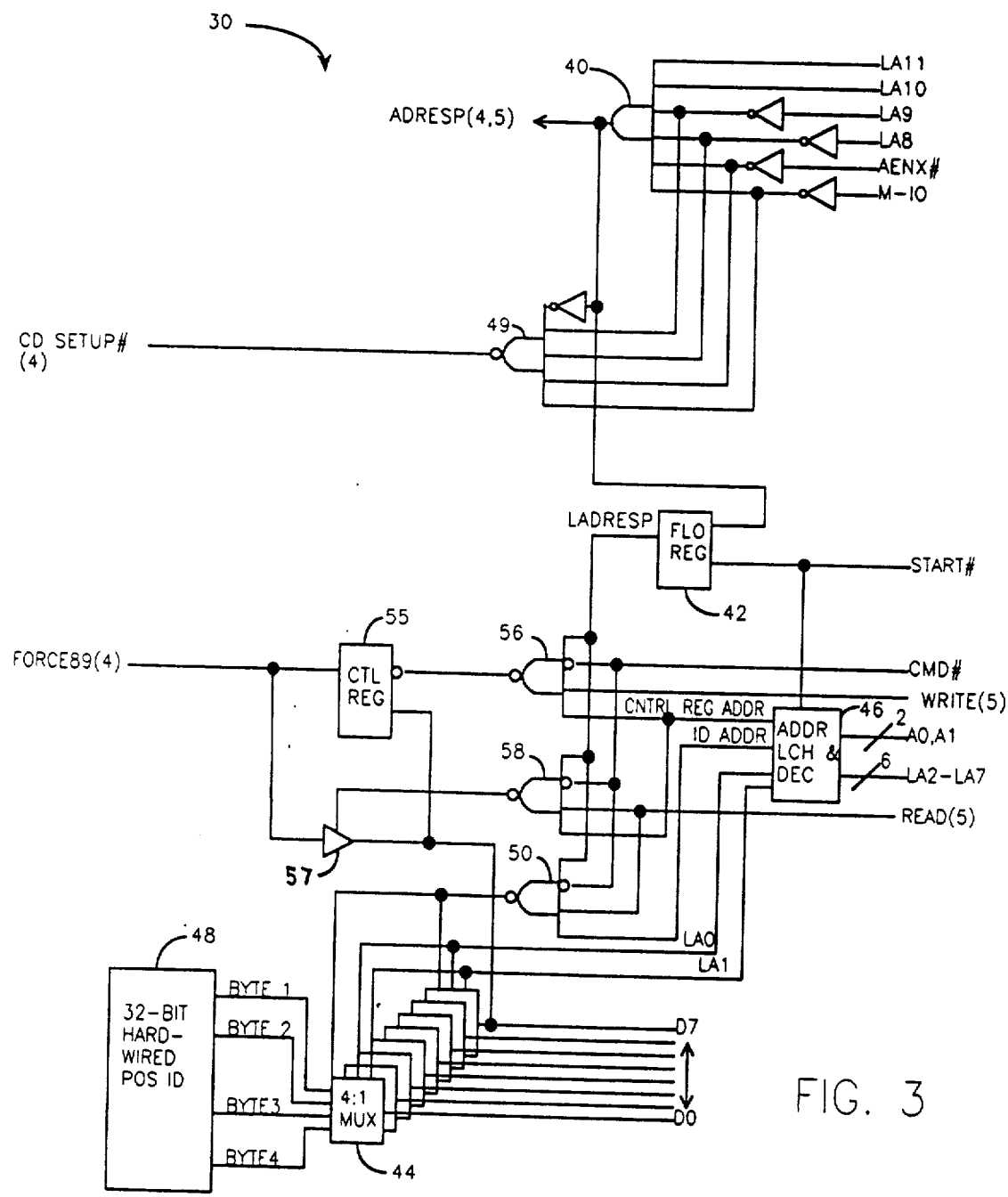
FIG. 3 is a schematic diagram of an initialization and identification circuit of the FIG. 2 slave adapter.

Referring to FIGS. 1 and 3, initialization of computer system 10 having Micro Channel expansion cards 20 and EISA cards 21 is a multiple step process. System control circuitry 14 first requests a first identification (ID) signal from each expansion card in system 10. Each adapter 22 responds to system control circuitry 14 with a 32-bit interface conversion logic ID signal, which indicates the presence of a Micro Channel card in system 10. Each expansion card 21 provides a 32-bit EISA identification signal.

System control circuitry 14 then requests from those slots which contain a Micro Channel card a Micro Channel slot ID signal and receives back a 16-bit Micro Channel expansion card ID signal from each expansion card 20 in system 10. Thus, system control circuitry 14 has an ID for each card 20, 21 in system 10. System control circuitry 14 then calls a configuration program which initializes the identified cards.

More specifically, referring to FIGS. 1 and 3, the initialization addresses used to request the first slot ID signal are XC80 to XC83 (X refers to a specific slot 18 in system 10); each of the four addresses requests one byte of the 4-byte ID. System control circuitry 14 routes the first initialization addresses to specific slots by issuing unique address enable (AENX#) signals to each slot. The coincidence of the AENX# signal and the inverse of a memory or I/O indication signal (M-IO) indicates to a slot that an I/O operation which is slated for that slot is being started on bus 16. If the address signal contains a C in address bits 8,9,10, and 11, as decoded by AND gate 40, in conjunction with the coincidence of the AENX# signal and the inverse of the M-IO signal, the address is recognized to be a slot-specific address which requires adapter 22 to respond and thus an active respond signal (ADRESP) is provided. The ADRESP signal is provided to flow register 42 is latched when system control circuitry 14 indicates the start of a transfer by activating the START# signal to provide a latched adapter respond signal (LADRESP).

The 4-byte ID is provided by initialization circuit 30 one byte at a time via eight 4-to-1 multiplexers 44. Each multiplexer 44 generates one bit of data and is connected to a respective data line (D0 to D7) of bus 16. Latched address bits LA0 and LA1 function as multiplexer select signals and are provided by address latch and decode circuit 46 based upon the two low order address bits of addresses XC80 to XC83. The LA0 and LA1 bits select which byte is read from ID circuit 48. ID circuit 48 is hardwired to a specific 32-bit pattern that uniquely defines the ID of all adapters 22a. The ID which is defined by ID circuit 48 indicates to system control circuitry 14 that a Micro Channel slave card 20a is connected to a particular slot 18 via adapter 22. Address latch and decode circuit 46 is also used to latch and store the eight low order address bits as well as to decode address bits A2 to A7 to provide a decode address signal (ID ADDR) which indicates when the two low order bytes of the address signal are between 80 and 83. The ID ADDR signal is the and of A7, A6#, A5#, A4#, A3#, and A2#.

Multiplexers 44 include tri-state drivers which drive data lines D0 to D7 to present the first ID signal to bus 16 one byte at a time. The tri-state drivers are enabled by NAND gate 50 when data transfer control circuit 34 provides an active conduct read operation signal (READ) concurrently with an active data transfer signal (CMD#), which is provided by system control circuitry 14 to indicate that data are being presented to bus 16, an active LADRESP signal and an active ID ADDR signal. System control circuitry 14 reads the four bytes of the first ID signal provided by multiplexers 44.

System control circuitry 14 then issues a Micro Channel ID read command using slot specific I/O addresses (X000 and X001). One address is used for each byte of the Micro Channel ID signal. Initialization circuit 30 receives I/O addresses X000 and X001 and instructs address translation circuit 32 to generate Micro Channel initialization addresses (0100 and 0101) which Micro Channel card 20a understands and responds to as if the Micro Channel card were installed in a Micro Channel system. Micro Channel cards 20 interpret I/O addresses which are in the range 0100 to 0107 and concurrent with the issuing of a slot-specific setup signal (CD SETUP#) as being initialization commands (referred to as Power-on Option Select (POS) commands). Therefore, addresses 0100 and 0101 are interpreted as POS commands.

The CD SETUP# signal indicates that a slot specific I/O address is being provided to card 20. The slot specific I/O addresses which system control circuitry 14 issues to read the Micro Channel ID signal are in the range 0000 to 0007 in conjunction with the AENX# signal. Address translation circuit 32 detects the slot specific addresses which are issued by system control circuitry 14 and adjusts bit 8 of these addresses to provide addresses in the range 0100 to 0107 to card 20.

The CD SETUP# signal, which identifies POS commands to Micro Channel card 20, is generated by NAND gate 49 which receives the inverse of the ADRESP signal, the inverse of the LA8 and LA9 signals (which in EISA identify a slot specific address), the inverse of the AENX# signal, and the inverse of the M-IO signal. Accordingly, an active CD SETUP# indicates that the transfer over bus 16 is slot specific and related to Micro Channel initialization.

Upon receiving the POS commands, card 20a returns its 2-byte ID code directly to system control circuitry 14. System control circuitry 14 then combines the 2 IDs (the 32-bit ID from interface conversion logic 28 and 16-bit Micro Channel ID from card 20) to provide a unique Micro Channel card identifier.

Figure 4:
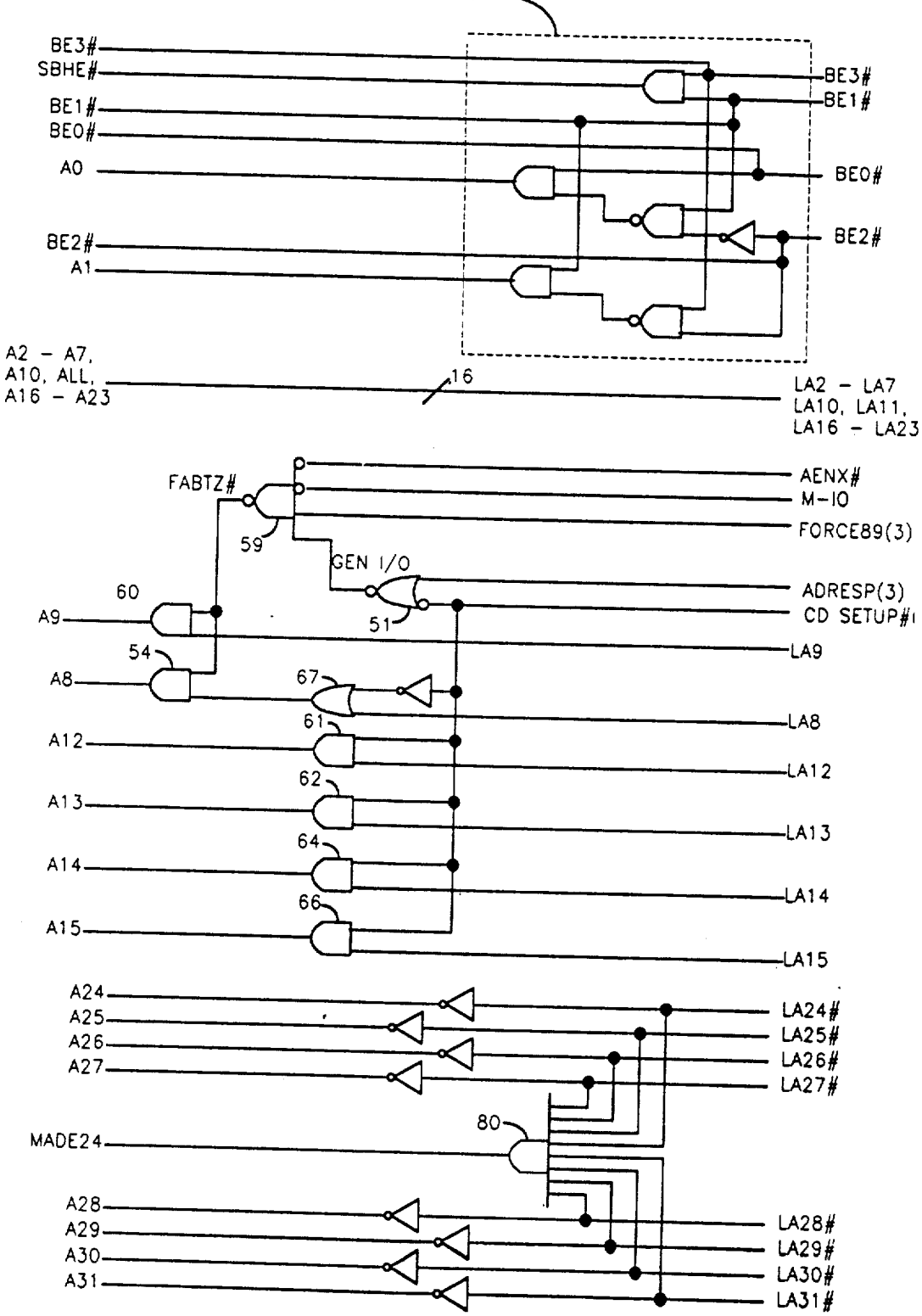
FIG. 4 is a schematic diagram of an address translation circuit of the FIG. 2 slave adapter.

Referring to FIGS. 3 and 4, EISA defines I/O addresses which are not slot-specific as general I/O addresses. All cards 20 in system 10 decode general I/O addresses presented to bus 16 to determine whether or not the address is within the specified range of response for that card. Interface conversion logic 28 detects general I/O addresses and passes them via address translation circuit 32 to card 20. Card 20 decodes the general I/O addresses and, if necessary, responds to them.

NOR gate 51 receives the ADRESP signal and the inverse of the CD SETUP# signal and generates a general I/O address signal (GEN I/O) when the address which is provided to bus 16 is not slot specific. If either the ADRESP signal is high (indicating that the address is requesting a response from adapter 22) or the inverse of the CD SETUP# signal is high (indicating that the address is a Micro Channel initialization address), then the address is slot specific.

Micro Channel card 20 could have a hardwired general I/O address range that is not within the EISA general I/O range (any address with a 0 in bits 8 and 9 is by EISA definition a slot-specific address and cannot be a general I/O address). Accordingly, if, during initialization, system control circuitry 14 determines that card 20 has a hardwired general I/O address range which requires bits 8 and 9 to be zeros, system control circuitry 14 has the ability to write and read control register 55 in initialization circuit 32. This control register 55 provides a force bits 8 and 9 to zero control signal (FORCE 89).

More specifically, control register 55 of initialization circuit 30 sets the FORCE 89 signal when system control circuitry 14 sets data line 7 (D7) while control register 55 is enabled by NAND gate 56. NAND gate 56 enables control register 55 when I/O address XC00 is provided by system control circuitry 14 (as indicated by an active CNTRL REG ADDR signal which is provided by address latch and decode circuit 46 when the eight low order address bits are all low) in conjunction with an active LADRESP signal, an active CMD# signal and an active WRITE signal. To allow system control circuitry 14 to read the FORCE 89 signal, it is provided to tri-state driver 57 which is enabled by NAND gate 58. NAND gate 58 receives the CNTRL REG ADDR signal, the LADRESP signal, the CMD# signal and the READ signal. Thus, when flow register 55 is enabled, tri-state driver 57 is also enabled and drives the FORCE89 signal onto the D7 line of bus 16, and when flow register 55 is disabled, tri-state driver 57 is also disabled and does not drive the FORCE89 signal onto the D7 line of bus 16.

When the FORCE89 signal is set, address translation circuit 32 provides general I/O addresses with zeros in bits 8 and 9 to Micro Channel card 20. The FORCE 89 signal is provided to NAND gate 59 which also receives the GEN I/O signal, the inverse of the AENX# signal and the inverse of the M-IO signal. NAND gate 59 provides an active low force address bits 8 and 9 to zero signal (FABTZ#) to AND gate 54 and AND gate 60. The FABTZ# signal, when active, causes AND gates 54, 60 to force the A8 and A9 signals, respectively, low.

During initialization, address translation circuit 32 must also guarantee that address bits LA12 to LA15, which select slot X, are not provided directly to card 20, which expects addresses between 0100 and 0107 and thus expects these four bits to be 0. Accordingly, AND gates 61, 62, 64 and 66 of address translation circuit 32 force Micro Channel address bits A12 to A15, respectively, low when the CD SETUP# signal is active.

Address translation circuit 32 must also guarantee that address bit A8 is high during POS initialization. Accordingly, OR gate 67 forces address bit A8 high when the CD SETUP signal is active and the FABTZ# signal is inactive.

After initialization, address translation circuit 32 receives EISA address information and provides Micro Channel address information. The EISA address information includes a 30-bit EISA address signal (LA2--LA23, LA24#-LA31#) and EISA byte enable signals (BE0#-BE3#). The Micro Channel address information includes a 32-bit Micro Channel address signal (A0-A31), Micro Channel byte enable signals (BE0#-BE3#), and Micro Channel address control signals (SHBE#, and MADE24).

Byte enable decode logic 70 of address translation circuit 32 uses the EISA byte enable signals to provide the two low order bits of the Micro Channel address signal (A0, A1) and the SHBE# signal. No conversion is necessary for the byte enable signals, these signals are provided directly to card 20.

No conversion is required for 16 bits of the EISA address signal (LA2-LA7, LA10, LA11, LA16-LA23); these 16 bits are provided directly to card 20 as Micro Channel address signals (A2-A7, A10, A11, A16-A23).

The eight high order EISA address bits (LA24# to LA31#) are inverted to provide the eight high order Micro Channel address bits (A24 to A31) because EISA uses active low address bits for this part of the address. signal and Micro Channel requires this part of the address signal to be active high. The LA24# to LA31# address bits are also anded in AND gate 80 to provide a 24-bit indication signal (MADE24) which is used by Micro Channel cards 20 to determine whether the card utilizes a Micro Channel 24-bit addressing option. The MADE24 signal is activated if all eight EISA high order address bits inactive.

Figure 5:
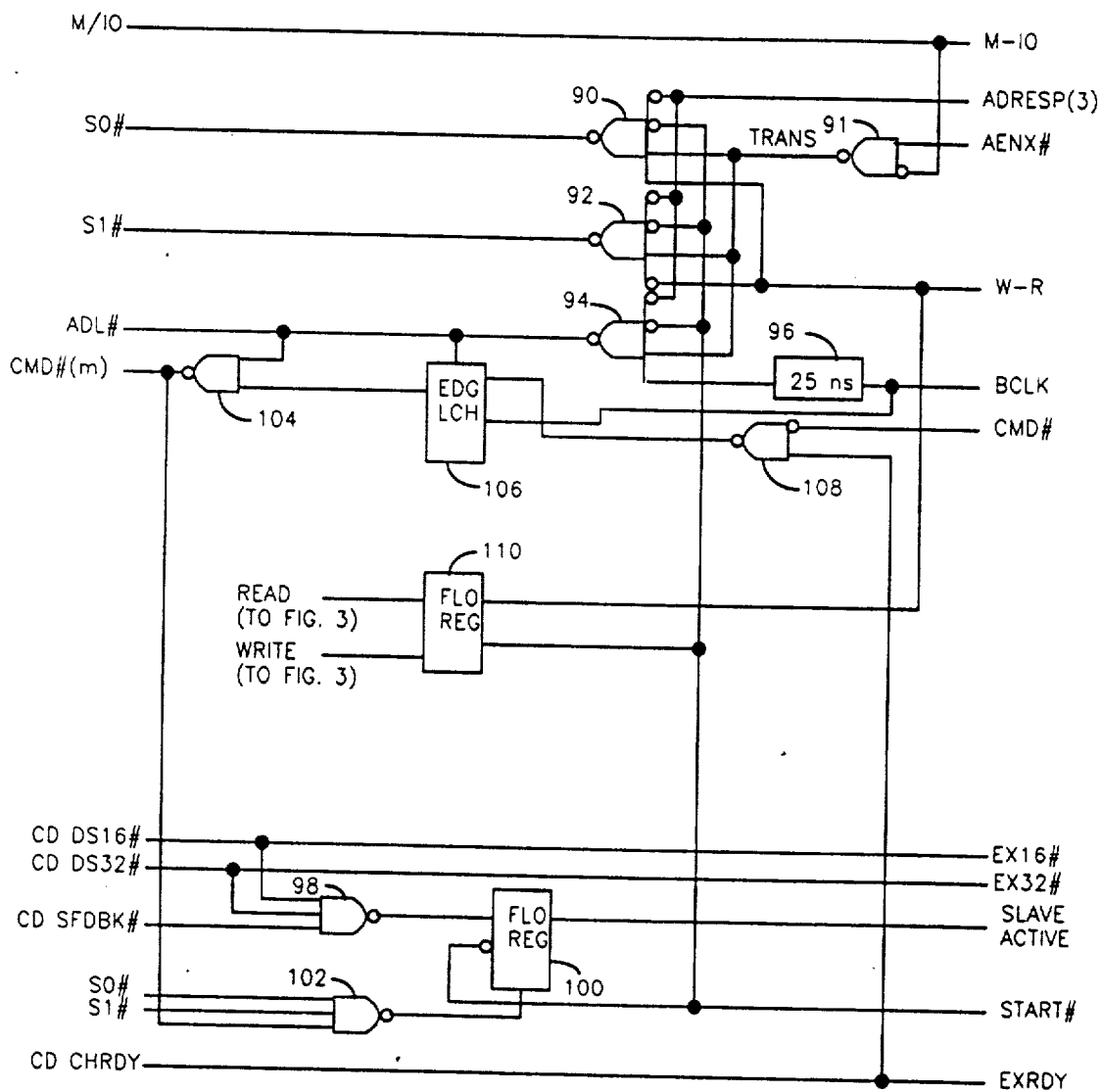
FIG. 5 is a schematic diagram of a data transfer control circuit of the FIG. 2 slave adapter.
Figure 6:
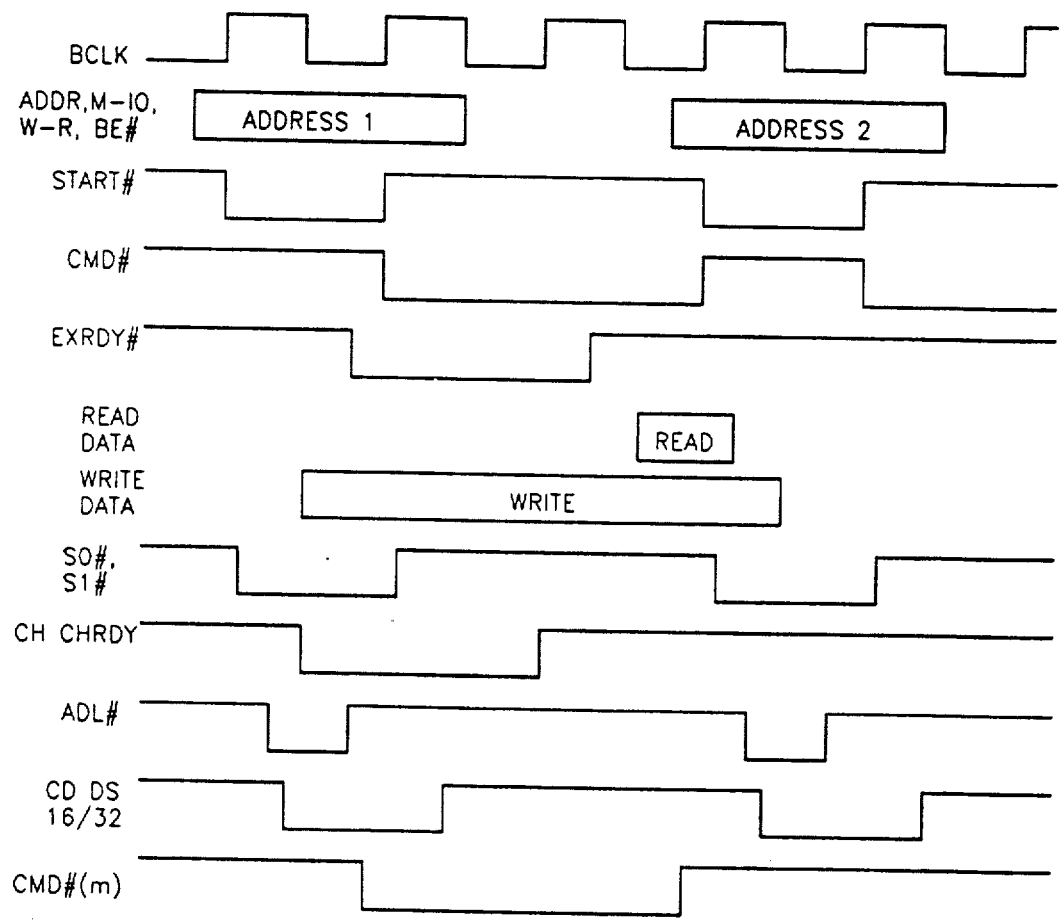
FIG. 6 is a timing diagram of the FIG. 2 slave adapter.

Referring to FIGS. 1, 5 and 6, system control circuitry 14 or master 20b begins an EISA data transfer via bus 16 by placing EISA address information (ADDRESS 1) on bus 16 at least 10ns before the rise of the BCLK signal and the fall of the START# signal. The EISA address information includes a 30-bit address signal as well as the following transfer control signals: a memory or I/O control signal (M-IO) which indicates whether the associated address is a memory address or an I/O address (1=Memory); a write or read transfer signal (W-R) which indicates whether the transfer operation is a write operation or a read operation (1=Write); and, a 4-bit byte enable signal (BE0-3#) which indicates which of the four bytes within a 32-bit word are to be written or read (0=byte enabled).

Micro Channel card 20 requires a start write operation control signal (S0#) and a start read operation control signal (S1#) as well as an address latching signal (ADL#) to initiate a data transfer. Data transfer control circuit 34 provides the S0#, S1# and ADL# signals to card 20 using the AENX# signal, the M-IO signal, the W-R signal and the ADRESP signal in conjunction with the START# signal and the BCLK signal.

More specifically, NAND gate 90 provides the S0# signal by nanding the inverse of the ADRESP signal, the inverse of the START# signal, a transfer control signal (TRANS), and the W-R signal. The TRANS signal is provided by NAND gate 91 from the nand of the AENX# signal and the inverse of the M-IO signal;

thus, TRANS indicates a data transfer to a Micro Channel card. NAND gate 92 provides the S1# signal by nanding the inverse of the ADRESP signal, the inverse of the START# signal, the TRANS signal and the inverse of the W-R signal. The timing for the S0# and S1# signals corresponds to the timing of the START# signal.

The ADL# signal is generated by data transfer control circuit 34 by nanding in NAND gate 94 the inverse of the ADRESP signal with the inverse of the START# signal, the TRANS signal, and a delayed BCLK signal. The delayed BCLK signal is provided by 25 nsec delay circuit 96. The delay is necessary to provide the timing relationships between S0#, S1# and ADL# which are defined in the *IBM Personal System/2 Hardware Interface Technical Reference* specification.

The address signal is generated by system control circuitry 14 and converted by address translation circuit 32 to provide a Micro Channel address signal to card 20a. Card 20a determines whether the Micro Channel address signal is within its range. If the address is not within the range of card 20a, card 20a does nothing. If the Micro Channel address signal is within the range of card 20a, card 20a responds by activating a send feedback signal (CD SFDBK#) to indicate that it is active. Additionally, card 20 activates a first Micro Channel size signal (CD DS32#) to indicate that it handles 32-bit data information, a second Micro Channel size signal (CD DS16#) to indicate that it handles 16-bit data information, or neither the DS32# signal or the CD DS16# signal to indicate that it handles 8-bit data information.

The CD DS32# and CD DS16# signals are connected directly to EISA size signals (EX32# and EX16#) which inform system control circuitry 14 of the data size that slave 20a is capable of supporting. System control circuitry 14 thinks that an 8-bit Micro Channel card is an 8-bit Family 1 card; however, control circuitry 14 still provides card 20 with the START# and CMD# signals as well as Family 1 control signals. Therefore, interface conversion logic 28 uses the START# and CMD# signals to control 8-bit transfers as it would to control 16 and 32-bit transfers.

The CD DS16#, CD DS32# and CD SFDBK# signals are also provided to NAND gate 98. NAND gate 98 provides an output to flow register 100 which, on the rising edge of START#, latches a slave active signal (SLAVE ACTIVE) which indicates to adapter 22 whether card 20 is responding to the transfer sequence in progress. The SLAVE ACTIVE signal is reset when S0#, S1# and CMD# become inactive as detected by NAND gate 102.

System control circuitry 14 completes the data transfer by activating the CMD# signal. Card 20 also uses a CMD# signal to indicate that a data transfer is complete; however, the timing of the Micro Channel CMD# signal is different from that of the EISA CMD# signal. Interface conversion logic 28 adapts the timing of the EISA CMD# signal to provide the Micro Channel CMD# signal. The Micro Channel CMD# signal is issued from when ADL# goes inactive, as detected by NAND gate 104, until when the EISA CMD# signal and EISA ready signal are active at rise of the BCLK signal, as detected by edge latch 106 and NAND gate 108. Latch 106 provides the other input of AND gate 104. The amount of time which is available for data transfer can be lengthened by providing an active channel ready signal (CD CHRDY) to NAND gate 108. The Micro Channel CD CHRDY signal corresponds to the EISA EXRDY signal; therefore, the two signals are directly connected.

Data transfer control circuit 34 also includes READ/WRITE flow register 110 which latches the W-R signal at the fall of the START# signal to provide the READ signal and the WRITE signal. The READ and WRITE signals, which are provided to initialization circuit 30, indicate whether a transfer is a read operation or a write operation; register 110 provides these signals throughout an entire transfer sequence.

OTHER EMBODIMENTS

Other embodiments are within the following claims.

For example, interface conversion logic 28 may be integral with either system board 12 or expansion card 20. A first connection device is used to integrally connect a first architecture to interface conversion logic 28; a second connection device is used to allow connection with the second architecture.

What is claimed is:

1. An apparatus for transferring data between a computer system having a first bus architecture having first data information, first address information and first control information and a slave element having a second bus architecture having second data information, second address information and second control information, the second bus architecture being different from the first bus architecture, comprising a first connector corresponding to said first bus architecture, a second connector corresponding to said second bus architecture, and conversion circuitry electrically connected between said first connector and said second connector, said conversion circuitry including means for converting the first data, address and control information to the second data, address and control information, and said conversion circuitry including means for converting the second data, address and control information to the first data, address and control information.

2. The apparatus of claim 1 further comprising
    identification circuitry electrically connected to said first connector,
    said identification circuitry including means for identifying said apparatus to said first architecture.

3. The apparatus of claim 2 wherein
    said conversion circuitry includes said identification circuitry.

4. The apparatus of claim 2 wherein
    said identification circuitry includes means for allowing said slave element to provide slave element identification information to said computer system.

5. The apparatus of claim 1 wherein
    said first address information includes a plurality of first address bits and first byte enable signals,
    said second address information includes a plurality of second address bits,
    there are more second address bits than first address bits, and
    said conversion circuitry includes means for providing said second address bits using said first address bits and said first byte enable signals.

6. The apparatus of claim 5 wherein
    said first address information includes 30 first address bits, said second address information includes 32 second address bits, and said conversion circuitry includes means for providing said 32 second address bits using said 30 first address bits and said first byte enable signals.

7. The apparatus of claim 6 wherein
said first byte enable signals are used to provide the two least significant bits of said 32 second address bits.

8. The apparatus of claim 6 wherein
bits 2 to 23 of said first address bits are active high digital signals, bits 24 to 31 of said first address bits are active low digital signals, and said conversion circuitry includes means for converting all said first address bits to active high second address bits.

9. The apparatus of claim 1 wherein
said conversion circuitry includes means for receiving said first address information and said first data information from said first connector.

10. The apparatus of claim 9 wherein
said first address information includes slot specific address information.

11. The apparatus of claim 10 wherein
said slot specific address information includes
first slot specific address information,
  said first slot specific address information being manipulated by said conversion circuitry to correspond to said second address information, and
second slot specific address information,
  said second slot specific address information corresponding to said second address information.

12. The apparatus of claim 11 wherein
particular bits of said slot specific address information are decoded to determine whether said slot specific address information is first slot specific address information or second slot specific address information.

13. The apparatus of claim 10 wherein
said first address information includes first general input/output information,
  said first general input/output information having a first range,
said second address information includes second general input/output information,
  said second general input/output information having a second range, said second range being larger than said first range, and
said conversion circuitry expands the range of said first general input/output information to correspond to said second general input/output information.

14. The apparatus of claim 9 wherein
said first data information is passed directly to said slave element, and said second data information is passed directly to said computer system.

15. The apparatus of claim 14 wherein
a portion of said first data information is also used by said conversion circuitry to provide identification information to said computer system.

16. The apparatus of claim 1 wherein
said first control information includes start information and separate write/read information, said second control information includes start write information and start read information, and said conversion circuitry uses said start information and said write/read information to generate said start write information and said start read information.

17. An apparatus for transferring data comprising
system control circuitry,
a bus having a first bus architecture, said first bus architecture having first data information, first address information and first control information,
a slave element having a second bus architecture, said second bus architecture having second data information, second address information and second control information,
  said second bus architecture being different from said first bus architecture,
a first connection device corresponding to said first architecture,
  said first connection device being electrically connectable to said bus,
a second connection device corresponding to said second architecture,
  said second connection device being electrically connectable to said slave element, and
conversion circuitry electrically connected between said first connection device and said second connection device,
  said conversion circuitry including means for converting said first data, address and control information to said second data, address and control information, and
  said conversion circuitry including means for converting said second data, address and control information to said first data, address and control information.

18. The apparatus of claim 17 further comprising
identification circuitry electrically connected to said first connector,
  said identification circuitry including means for identifying said apparatus to said first architecture.

19. The apparatus of claim 18 wherein
said conversion circuitry includes said identification circuitry.

20. The apparatus of claim 18 wherein
said identification circuitry includes means for allowing said slave element to provide slave element identification information to said computer system.

21. The apparatus of claim 17 wherein
said first address information includes a plurality of first address bits and first byte enable signals, said second address information includes a plurality of second address bits, there are more second address bits than first address bits, and said conversion circuitry includes means for providing said second address bits using said first address bits and said first byte enable signals.

22. The apparatus of claim 21 wherein
said first address information includes 30 first address bits, said second address information includes 32 second address bits, and said conversion circuitry includes means for providing said 32 second address bits using said 30 first address bits and said first byte enable signals.

23. The apparatus of claim 22 wherein said first byte enable signals are used to provide the two least significant bits of said 32 second address bits.

24. The apparatus of claim 22 wherein
bits 2 to 23 of said first address bits are active high digital signals,
bits 24 to 31 of said first address bits are active low digital signals, and
said conversion circuitry includes means for converting all said first address bits to active high second address bits.

25. The apparatus of claim 17 wherein
said conversion circuitry includes means for receiving said first address information and said first data information from said first connector.

26. The apparatus of claim 25 wherein
said first address information includes slot specific address information.

27. The apparatus of claim 26 wherein
said slot specific address information includes
first slot specific address information,
   said first slot specific address information being manipulated by said conversion circuitry to correspond to said second address information, and
second slot specific address information,
   said second slot specific address information corresponding to said second address information.

28. The apparatus of claim 27 wherein
particular bits of said slot specific address information are decoded to determine whether said slot specific address information is first slot specific address information or second slot specific address information.

29. The apparatus of claim 26 wherein
said first address information includes first general input/output information,
   said first general input/output information having a first range,
said second address information includes second general input/output information,
   said second general input/output information having a second range, said second range being larger than said first range, and
said conversion circuitry expands the range of said first general input/output information to correspond to said second general input/output information.

30. The apparatus of claim 25 wherein
said first data information is passed directly to said slave element, and
said second data information is passed directly to said computer system.

31. The apparatus of claim 30 wherein
a portion of said first data information is also used by said conversion circuitry to provide identification information to said computer system.

32. The apparatus of claim 17 wherein
said first control information includes start information and separate write/read information,
said second control information includes start write information and start read information, and
said conversion circuitry uses said start information and said write/read information to generate said start write information and said start read information.

33. The apparatus of claim 17 wherein
said conversion circuitry is directly connected to said computer system.

34. The apparatus of claim 17 wherein
said conversion circuitry is directly connected to said slave element.

* * * * *